June 12, 1928.
W. J. LAFFEY
1,673,570
AUTOMATIC TIRE FASTENING AND RELEASING MEANS
Filed Jan. 31, 1927      2 Sheets-Sheet 1
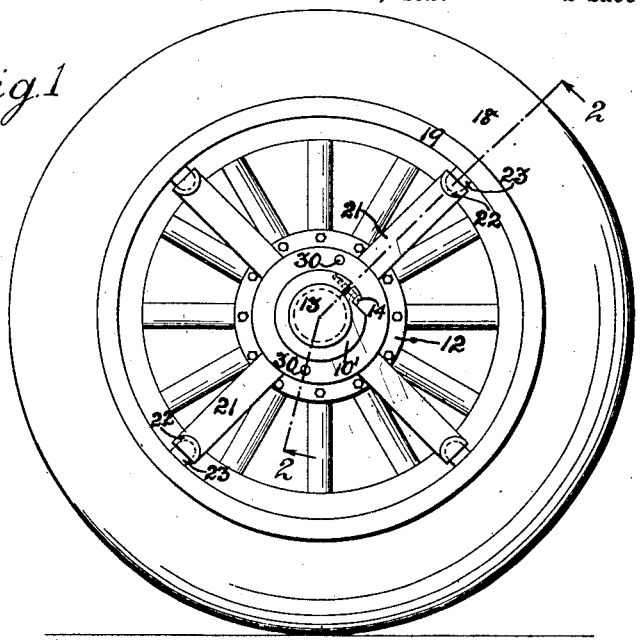
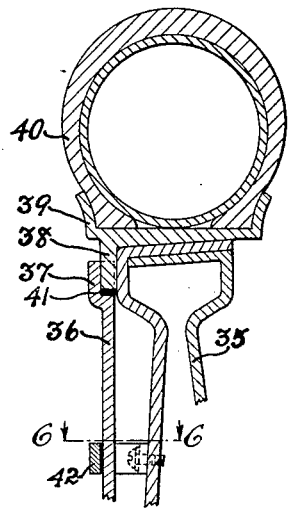
Inventor
William J. Laffey
by J. Daniel Struwe
Attorney June 12, 1928.
W. J. LAFFEY
1,673,570
AUTOMATIC TIRE FASTENING AND RELEASING MEANS
Filed Jan. 31, 1927 2 Sheets-Sheet 2
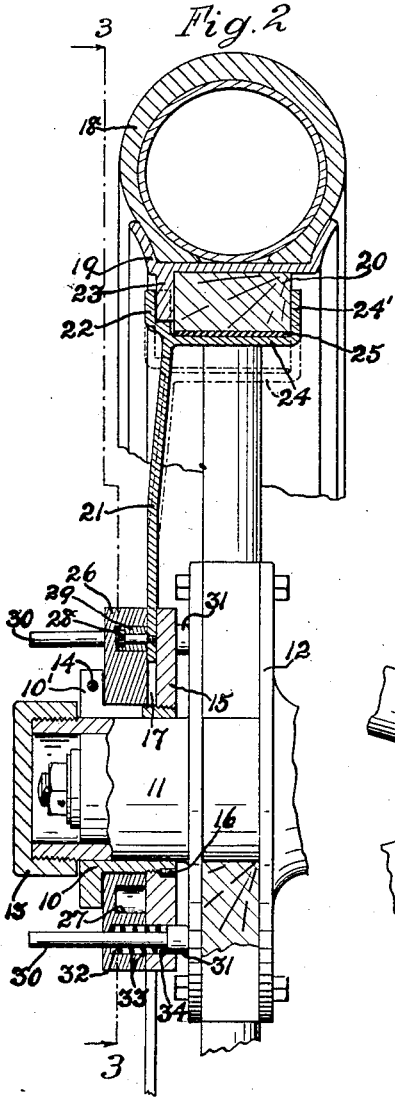
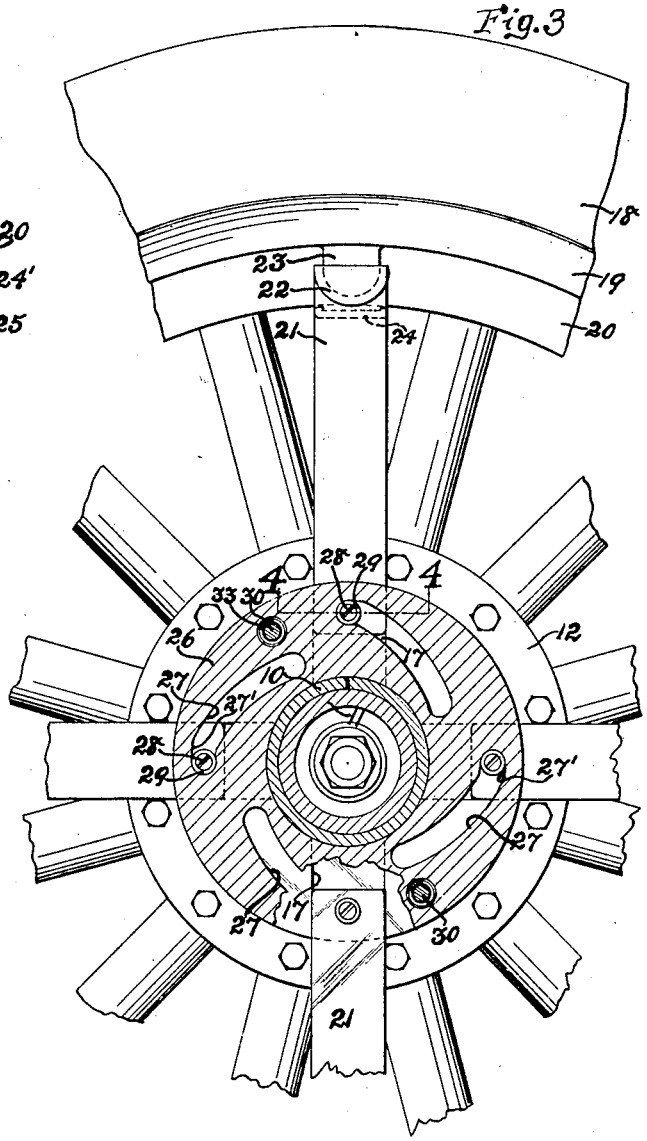
Inventor
William J. Laffey
by J. Daniel Stuwe
Attorney.

Patented June 12, 1928.

1,673,570

UNITED STATES PATENT OFFICE.

WILLIAM J. LAFFEY, OF CHICAGO, ILLINOIS.

AUTOMATIC TIRE FASTENING AND RELEASING MEANS.

Application filed January 31, 1927. Serial No. 164,708.

My invention relates to tire fastening and releasing means, and the main object is to provide a device with means easily and quickly operable by hand for fastening a tire with its rim onto the felloe of a wheel, and likewise for readily releasing said means to remove the rim and tire; and furthermore to arrange such means so that all the tire fastening elements will with a slight turn or movement of the hand be placed in their fastened position or in their released position. Another object is to provide means for locking the fastening means in either the released or the fastened position.

These and other objects will become apparent from the following description, taken in connection with the accompanying drawings, in which, Fig. 1 is a side elevation of an automobile wheel with the preferred form of my invention applied thereto;

Fig. 2 is an enlarged cross-section on line 2—2 of Fig. 1;

Fig. 3 is a vertical section in line 3—3 of Fig. 2;

Fig. 4 is an enlarged detail section on line 4—4 of Fig. 3;

Fig. 5 shows a slightly modified form, adapted for a disk wheel; and

Fig. 6 is a cross-section on line 6—6 of Fig. 5.

The form of my invention illustrated in Figs. 1, 2 and 3 comprises a sleeve or collar 10 fastened upon the hub 11 at the outer side of a wheel 12, inward of the hub cap 13. The sleeve is preferably fastened by splitting it and drawing the parts together with a screw 14 placed in an outer flange 10′ of the sleeve, thereby firmly clamping the sleeve on the hub. A disk or plate 15 is fastened on the inner end of the sleeve, as with threads and a locking pin or screw 16, and is provided with radial grooves or channels 17.

The means for fastening the tire 18 and rim 19 of the wheel to the felloe 20 thereof comprises arms or bars 21 extending radially from disks 15 and sliding in grooves 17. These arms have means at the outer ends for engaging the rim, preferably in the form of hands or cups 22 which embrace the lugs 23 usually extending from the outer part of the rim, and in this form of the invention said means also includes fingers 24 extending from the hands along the inner side of the felloe with their ends 24′ engaging the side of said felloe opposite the hands 22 and lugs 23. Strips 25 of compressible and frictional material is preferably also placed between these fingers and the felloe, to hold them in firm engagement. A plurality of these arms and the rim engaging means are provided for each wheel and sleeve.

I provide means for moving all of the arms with their rim engaging means simultaneously into the operative, engaging or holding position, and likewise into the inoperative or release position, and such means comprises a cap or cam member 26, placed rotatably on sleeve 10, between flange 10′ and disk 15, and having cam grooves 27 in its inner face. Pins 28 are placed on the inner ends of arms 21, and each carries a roller 29 to travel in a cam groove 27. These grooves are curved and turned, as shown in Fig. 3, so that when the cam member 26 is turned or moved on the sleeve the arms 21 with their means or hands 22 are all moved simultaneously, and automatically go into their operative position to hold the rim and tire on the felloe, or into their inoperative position or release position, as indicated in dot-and-dash lines in Fig. 2. The outer ends 27′ of grooves 27 are arranged circumferentially of the cam member so as to securely hold the rollers 29 at said end and the arms thereby in their outward or operative position.

I further provide means for positively holding or for locking the arms and their rim engaging means in the operative or rim holding position, and this preferably includes one or more shafts or rods 30 mounted through member 26 and having heads 31, urged out from pockets 32 by springs 33, and into bores 34 provided in disk 15, thereby locking the device in its operative position. These shafts or rods 30 are drawn outward to bring the heads 31 out of bores 34, and said shafts are then also useful for grasping to turn the cam member and thereby move the arms 21 and means 22 from one position into the other.

The form of my invention shown in Figs. 5 and 6 is particularly adapted for a disk wheel, 35, and comprises an arm 36 having a hand or cup 37 at its outer end for embracing the lug 38 on the rim 39 of the tire 40, a strip 41 of compressible and frictional material being preferably placed in the hand 37, as in the preceding form. Instead of the fingers 24 of the preceding form, for holding the hands firmly engaged with the rim lugs, I provide in this form a yoke or bent strap 42 fastened to the disk wheel 35, with screws or suitable means 43, for embracing the arm 36 and retaining it adjacent the wheel, to hold the hand 37 and strip 41 in firm engagement with lug 38.

It is apparent from the above disclosure that my invention may be provided in various forms, to suit the particular conditions and requirements, and that I have provided a device including means for conveniently fastening a rim with its tire on the felloe of a wheel, and that the same is readily operated by a slight movement of the hands, and without the use of a wrench or tool, thereby simultaneously and automatically moving all the fastening means into either the rim fastening position or into the rim releasing position, whichever is desired, to quickly and easily fasten the tire with its rim on the wheel or to release and remove it therefrom. This invention further entirely overcomes the necessity of making a number of holes through the felloe part of the wheel, which weakens it, or of tediously fastening a number of bolts through these holes and the lugs on the rim for mounting the rim on the wheel, or of removing such number of bolts at a great length of time when the rim is to be removed; but on the contrary my device is easily and quickly operated by a slight turn or movement of the hands.

What I claim as my invention and desire to secure by Letters Patent is:

1. A device for locking a demountable rim on a wheel, said device comprising an arm extending radially of the wheel and having a cup-shaped hand at its outer end to slidably embrace a lug positioned at the side of the rim for locking said rim on the wheel.

2. A device for fastening a rim on the felloe of a wheel, said device comprising an arm having a member for slidably embracing a rim lug positioned at one side of the felloe, and a curved finger extending from said member around said felloe to the side opposite said lug, for holding said device and the rim firmly in position on the felloe.

3. A device for fastening a demountable rim on the felloe of a wheel, said device comprising an arm extending radially of the wheel and having a cup-like hand at its outer end for slidably embracing a lug positioned at the outside of the rim and felloe, and a curved finger extending inwardly from said hand and curved up for closely engaging along the inner side of the felloe, thus firmly clasping the felloe between said finger and said lug and hand.

In testimony whereof, I have signed my name to this specification.

WILLIAM J. LAFFEY.